Nov. 1, 1960

P. D. WURZBURGER ET AL 2,958,544

SEPARABLE COUPLING FOR FLUID CONDUITS

Filed Nov. 8, 1954

INVENTORS
Paul D. Wurzburger
and Alden H. Milbrodt
By Bosworth, Sessions, Herrstrom and Knowles
Attorneys

INVENTORS
Paul D. Wurzburger
and Alden H. Milbrodt
By Bosworth, Sessions,
Herrstrom and Knowles
Attorneys United States Patent Office 2,958,544
Patented Nov. 1, 1960

2,958,544

SEPARABLE COUPLING FOR FLUID CONDUITS

Paul D. Wurzburger, Cleveland Heights, and Alden H. Milbrodt, South Euclid, Ohio, assignors to The Weatherhead Company, Cleveland, Ohio, a corporation of Ohio Filed Nov. 8, 1954, Ser. No. 467,523

13 Claims. (Cl. 284—18)

This invention relates to self-sealing fluid couplings of the quick acting type such as are used in hydraulic systems of aircraft and land vehicles. More particularly the fluid coupling contemplated is of the so-called "push-pull" type the parts of which are adapted to be connected and disconnected by simply pushing and pulling, respectively, without twisting or turning of one part relative to the other and without using special tools or coupling aids. It is apparent, however, that the present development, carried out in view of and with the objective of satisfying rigid requirements of aircraft manufacturers as to line pressures, operating forces, weights and envelope sizes, achieves many improvements over existing devices in the coupling field.

Tube couplings for use in hydraulic applications are commonly provided with valves which open when the coupling parts are brought together so as to provide the desired registered or connected passages for the free flow of fluid and which when the coupling parts are separated close automatically to seal off the ends of the separated coupling parts and thereby prevent the loss of fluid from either of the systems. The present invention is concerned with solving numerous problems associated with such self-sealing couplings to obtain reliability and efficiency. In the case of fluid couplings having separable parts of the quick acting type referred to it is desirable not only that the coupling parts be adapted for quick and easy connection and disconnection but that such connection and disconnection be accomplished by one hand of the operator when half the coupling is fast in a panel or bulkhead. It is, therefore, one of the principal overall objects of the present invention to provide a generally improved push-pull locking type self-sealing tube coupling capable of one-hand manipulation for both coupling and uncoupling operations and relatively simple in construction and economical to manufacture.

One aspect of the invention is concerned with the self-sealing features and is useful with fluid couplings other than of the push-pull type. This aspect of the invention is, however, closely allied to the push-pull coupling problem in that push-pull quick disconnect fluid couplings of the self-sealing type are limited with respect to the forces available for coupling and uncoupling; and, as will appear, the characteristics of the self-sealing features of the present invention are particularly suited to minimizing coupling forces. Furthermore, the self-sealing features concerned with the present line contact seals and operating sequences are particularly suited to use in the push-pull type of coupling in which connecting and disconnecting action is relatively rapid as compared to that of the screw type coupling.

In the construction of a coupling of the character referred to, having separable parts connectible to the ends of fluid or other conduits or elements to be joined, there are certain physical requirements that must be met. Couplings intended for use in hydraulic systems for military use must be light in weight, and their physical dimensions must be held within prescribed envelope limits. Lightness and compactness are, of course, desirable characteristics in couplings for both the commercial and military fields and accordingly these characteristics are objectives of the invention.

In the case of a sealing coupling used in a fluid line carrying fluid at high pressure considerable difficulty is experienced in obtaining fluid tight seals between the members of the coupling parts when they are connected together and in the individual valves when the coupling parts are separated. This problem is emphasized in those applications requiring the coupling to withstand extremely high pressures of hundreds or even thousands of pounds per square inch and also to maintain effective fluids seals at the low pressures which may prevail in the lines when the coupling parts are disconnected. Various types of resilient deformable seals have been resorted to, including rubber O-rings of different shapes and configurations. Seals that have been found effective at high pressures may be unsatisfactory at low pressures and vice versa. Seals that function at steady pressure may leak or fail under pressure surges or pulsations. One of the difficulties associated especially with operating conditions involving pressure surges is the dislodgment of the seal from its normal position. Not only is the loss of the seal objectionable because of the leak that results but because of the possible damage or inoperativeness that results to hydraulic equipment supplied by the line in question. To overcome these difficulties the present invention provides resilient deformable seals of the O-ring type that are substantially completely caged or enclosed when under pressure and even under storage conditions so as practically to eliminate the possibility of dislodgment.

As a refinement of this aspect of the invention the resilient O-ring seals associated with the movable valves are contained in circular grooves and effect circular seals with surfaces that substantially close the openings into the grooves while the seal is under pressure. More specifically, the grooves having the O-ring seals open radially either inwardly or outwardly and the cooperating sealing surfaces move axially relative to the planes of the respective O-rings so that the O-rings slide or roll on the sealing surfaces. In such an arrangement provision for accommodating surges in the fluid line pressure is achieved simply by allowing for axial movement of the circular sealing surface relative to the O-ring while the circular seal is maintained. In the case of an O-ring that must be brought into and out of engagement with its companion sealing surface each time the coupling is connected and disconnected, provision is made for moving such companion sealing surface substantially completely across the annular opening into the O-ring groove prior to subjecting the seal to fluid pressure. This arrangement eliminates dislodgement of the seal from its groove by the sudden application of fluid pressure to the seal resulting from the opening of the fluid passage through the coupling. In the uncoupling operation the fluid passage is closed by the valve body before the O-ring seal is released by its companion sealing surface so that dislodgment of the O-ring seal is practically eliminated. By reason of the location of the O-ring seals in grooves that open radially, as distinguished from axially, the possibility of losing any of the seals from their grooves is minimized. To remove or dislodge one of the circular O-ring seals it must be circumferentially contracted or distended, requiring corresponding stressing of the ring. The inherent resiliency of the O-ring seal resists such circumferential distortion and thereby serves to retain the seal in its annular groove.

In the case of a coupling that is to be used in a fluid line under continuous pressure, difficulty is encountered when the valve bodies that seal the internal fluid passages of the coupling part are held against their seats by the pressure of the fluid in the line. The present invention, as another of its objectives, provides an arrangement wherein the forces to which the valve bodies are subjected by the pressure of the fluid in the line are partially balanced so that the force by which each valve body is held against its seat by fluid line pressure is kept within limits that permit manual operation of a push pull locking structure for the coupling. More specifically, the valves of the present coupling are arranged so that while the internal fluid pressure of the line forces the valve body against its valve seat an opposing force resulting from fluid line pressure becomes effective immediately upon cracking open of the valve body so that in the open condition the resultant fluid pressure force acting on the valve body, although biasing it toward passage sealing position, is less than the force which holds the valve body against its seat when the fluid passage is sealed by the valve. As one aspect of this feature concerned with the fluid pressure forces acting on the valve bodies it has been found advantageous to vent to atmosphere the interior portion of the coupling, this portion, in the present arrangement, being within one of the passage sealing valve bodies. The venting arrangement referred to eliminates the need for any special configuration of the central components of the coupling structure with respect to exclusion or entrapment of air or fluid.

A further objective of the invention is concerned with the provision of a coupling in which the loss of fluid from the system during each coupling and uncoupling is minimized and in which the entrapment of air that finds its way into the fluid system during each coupling operation is also minimized.

A still further objective of the invention is directed to minimizing the axial force necessary to assemble push pull coupling parts of the type having internal valves that must be opened against the pressure of the fluid in the line. In the arrangements that provide for simultaneous displacement of the valve bodies from their respective valve seats the valve opening forces must, of course, be applied simultaneously. In the present arrangement the internal valves are opened serially and, as mentioned above, the arrangement of the circular seals associated with each valve body is such that the axial force required to hold the valve body away from its seat is less than the force required initially to crack open such valve. The present system thus provides a predetermined stepwise opening sequence. The internal valve first to be opened is determined by the geometry of the structure; and, since it is held retracted by less than its opening force, the first opened valve is positively held open during the opening of the second internal valve. Now with respect to the push pull interlocking arrangement the present invention, as one of its principal features, provides an interlocking mechanism that requires a greater axial force for its operation than is required for opening the internal fluid valves, the mechanism being so arranged that the valve opening force is transmitted through the push pull interlock structure. Thus the force applied to the interlock structure by the operator in coupling the parts together is progressive in nature, first one and then the other of the internal valves being opened and then the interlock being actuated to secure the coupling parts together. By such arrangement the lesser forces involved in opening and holding open the internal valves are included in the larger force required to actuate the locking mechanism, and the magnitude of the total force that must be applied by the operator is less than is necessary in a device requiring the operator to apply an actuating force to the interlock mechanism separately from the force applied to open and hold open the internal valves.

Still other objects and advantages of the invention relate to certain novel combinations and arrangements of parts obtaining simplicity and economy in manufacture and facilitating assembly, inspection and service in the field. As one specific aspect of this phase of the invention the present coupling is so constructed that it employs standard O-rings for effecting the several circular seals between the movable valve bodies and the coupling body members and stems. Certain of the O-rings are exposed for visual inspection when the coupling parts are separated and can be removed and replaced without special tools. Other objects and advantages are apparent from the following detailed description of the invention made in connection with the accompanying drawings forming a part of the specification and illustrating several couplings representing the best known mode of practising the invention.

The separable coupling parts are designated generally at B and C, the latter carrying an axially slidable lock actuating sleeve A. This sleeve actuates a ring type locking structure that holds the coupling parts together and that is more fully described further on, being the subject matter of copending application of Paul D. Wurzburger, Serial No. 467,522 filed November 8, 1954 now Patent 2,837,352 for Swivel Coupling With Resilient Ring To Bias Detent Means.

*Plug end coupling part*

The coupling part B comprises a tubular body member 1 formed as by forging or machining a suitable metal such as aluminum. Base end 2 is formed as with external and internal threads for attachment to a support and to the hydraulic conduit or line to be terminated by the coupling part B. Intermediate its ends the body member 1 is formed with an integral radial enlargement comprising an external hex section 3 over which may be received a plate 4 stamped or otherwise formed with a hex embossment 5 that matches and receives the body hex 3. The plate 4 is located in predetermined axial position relative to the tubular body member 1 by engagement against radial abutment means or shoulder of the body hex 3 and serves as a mount for wall attachment of the coupling body. The coupling part may, of course, be used without the mounting plate 4, being then free on the end of the line or conduit, wholly supported by the latter.

The other or front end of the tubular body 1 is threaded internally at 6 to receive a tubular extension member 8 which is coaxial to the main body member 1 and, as will appear, constitutes the element which physically connects the coupling parts and transmits all stresses tending to separate the coupling parts. To effect a seal between the main body member 1 and its extension 8 the circumferential meeting faces of these parts are formed inside the interlocking threads 6 with an annular chamber that receives an elastic deformable sealing ring 13. The radial face at the base end of the body is seated flatwise against the radial shoulder 7 of the body extension.

Intermediate its ends the main body member 1 is formed with an integral internal web or partition 15 which supports a hollow stem 16 in coaxial relation to the body member. The partition 15 is located at or adjacent the plane of the hex portion 3 so that the heavy section of the latter serves as reinforcement for the body at the region where occurs any stress resulting from attachment of the hollow stem 16. The stem has a cylindrical outer surface 17 spaced from inside circular wall 24 of the body extension member in the provision of an annular channel 19. This channel communicates with main channel 20 of the body 1 through a series of oblique passages 21 drilled through the partition web 15 at points equally spaced circumferentially about the stem 16.

Within the body extension 8 the fluid passage is thus defined by a circular surface of revolution that includes the cylindrical portion 24 and a frustoconical or tapered valve seat portion 25. The small diameter end of the frustoconical surface 25 terminates at a circular outlet opening 26 which is axially spaced inwardly from front end face 27 of the extension 8. Between the outlet opening 26 and the end 27 the extension body member 8 defines a socket of circular cross section which, as will appear, is adapted to mate with one of the valve components of the companion coupling part. To effect a seal with such mating part, the socket wall is formed with an annular internal groove 28 to receive a resilient deformable circular seal such as rubber O-ring 30.

*Stem sealing valve*

Sealing of the coupling part B when it is disconnected from the coupling part C is effected by a barrel-shaped valve body 32 which is mounted on the center stem 16 for axial sliding movement. The interior of the barrel 32 is cylindrically shaped and has a running fit on the cylindrical outer wall 17 of the center stem.

Figure 4:
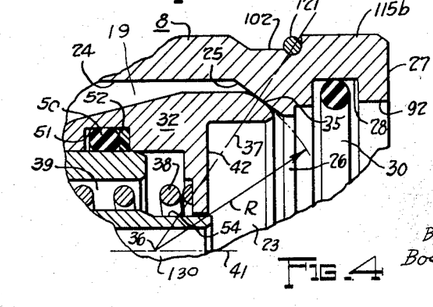
Fig. 4 is a fragmentary sectional detail showing the barrel-shaped valve body of the internal coupling part and the characteristics of the spherical sealing face on such valve body, this view being enlarged with respect to Fig. 2.
Figure 5:
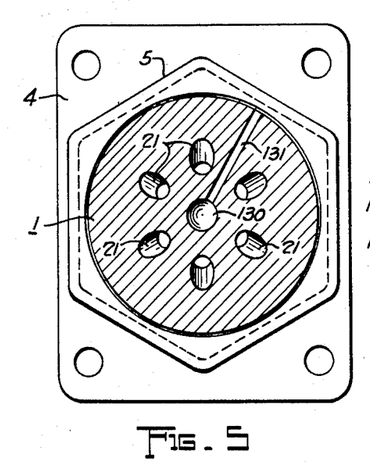
Fig. 5 is a sectional view taken transversely through the internal coupling part to show, in particular, the passage for venting the internal rigid stem and associated components of the coupling, this view being taken substantially along the line indicated at 5—5 of Fig. 1.

The forward end of the barrel valve 32 is formed with a polished or ground sealing surface 35 which is spherical in shape so as to make circular line contact with the frustoconical valve seat 25 on the inside of the tubular body extension 8. To obtain a fluid-tight seal in different positions of engagement of the valve against the valve seat, the surface which defines the spherical end face 35 is generated by a radius R, Fig. 4, centered at a point 36 determined by the intersection of a line 37 and centerline or axis 41 of the coupling part B. The extension member 8 may comprise a machining of magnesium, aluminum or similar light metal, thus achieving the desired lightness in the coupling, and the barrel valve body 32 may be a harder metal, such as a standard chromium nickel stainless steel alloy. Spring 38 is received in a deep circular channel 39 that opens through end face 40 of the stem 16 and is concentric to the axis of the coupling part. The spring reacts between the bottom of the channel 39 and a radial inwardly directed circular flange or web 42 that is formed interiorly of the valve body 32 intermediate the ends of the latter. This web in effect divides the interior of the barrel valve 32 into cylindrically walled coaxial recesses that open through opposite ends of such valve body, one to receive the cylindrical portion 17 of the stem 16 and the other, indicated at 23, to receive head end 66 of the stem in the other coupling part.

In moving to its passage sealing position the valve body 32 is guided by the sliding fit on the cylindrical surface 17 of the stem, and a seal at the diameter of this cylindrical surface is provided as by a resilient rubber O-ring 50 and a flat backup washer 52 of tough plastic material carried in a circular groove 51 formed about the internal cylindrical guide surface of the valve body 32. Similar backup washers or rings 52 are shown in association with others of the O-ring seals. As a supplemental guide for the barrel valve body 32 as it moves to passage sealing position the stem 16 is formed with a reduced diameter cylindrical portion 54 which has a free easy sliding fit within center circular opening 55 of the valve web 42.

*Socket end coupling part*

The companion coupling part C that mates with the coupling part B comprises a main tubular body member 60 formed as by forging or machining a suitable light metal, such as aluminum. At its rear end the main body is threaded at 61 or otherwise formed for connection to the end of the conductor or line to be terminated by the coupling part and which line delivers or receives fluid to or from the coupling through center passage 62 of the coupling part. Disposed within the main body 60 is a coaxial rigid tubular stem 63 formed of suitable high strength, tough metal such as the nickel chromium steel alloy previously mentioned and commonly known as stainless steel. This stem has a rear or base end screw threaded at 64 into a socket within the interior and intermediate the ends of the main body 60. The hollow interior of the stem 63 constitutes a central fluid passage 65 which extends as a continuation of the main fluid passage 62. At its forward end the stem 63 is formed with an integral enlarged head 66 that terminates the passage 65, the head being hollow or recessed and open through front end face 67 of the stem. Axial recess 68 thus provided in the front or outer end of the stem 63 has a hex or other noncircular section to accommodate a wrench for turning the stem into the threaded joint 64. The head 66 has an outwardly directed peripheral surface 57, here cylindrical to fit matingly within the cylindrical socket or recess 23 in the barrel valve 16 of the other part when the coupling parts are assembled together. An O-ring 59 in a circular groove 58 turned in the surface 57 about the stem head 66 effects a circular line contact sliding seal between the stem and the valve body at the diameter of the cylindrical socket surface 23. Surrounding the stem 63 is an annular chamber 70 defined by the inwardly directed circular sectioned and irregularly shaped or progressively stepped walls of the main tubular body member 60. This chamber communicates with the central fluid passage 65 of the stem through a series of circumferentially spaced oblique holes or ports 71 drilled or otherwise formed through the stem 63 immediately behind the head portion 66.

When the coupling parts are assembled the forward end of the extension member 8 of the coupling part B projects into the chamber 70 of the coupling part C so that the fluid passages defined by the holes 71 are aligned with the annular passage defined by the frustoconical seating wall 25 of the tubular extension 8 and the retracted valve body 32 for smooth fluid flow.

Body sealing valve

The annular chamber 70 is sealed against the flow of fluid through the coupling part C by a sleeve valve body 72 that surrounds the stem 63 in spaced coaxial relation. This sleeve is guided for reciprocatory axial movements by an internally directed cylindrical surface 73 which embraces the sleeve and is formed on the inside of the main tubular body 60. The sleeve valve, formed of a tough, wear-resistant metal such as chromium stainless steel alloy, commercially identified as 430 F, has an external cylindrical surface 74 that slides in the guide surface 73 of the body member. To obtain a sliding relationship of adequate axial length within prescribed minimum limits of overall coupling length, the cylindrical guide surface 73 of the tubular main body is continuous into an annular channel 75 that is concentric to the coupling axis and surrounds that portion of the main body in which are formed the threads 64 that anchor the stem 63. In its reciprocatory movements opening and closing the fluid passage the sleeve valve 72 moves axially in the channel 75. Circular channel 76, opening through the cylindrical guide surface 73 intermediate the ends of the latter, is formed in the coupling body 60 to accommodate a deformable circular seal such as a rubber O-ring 77. This O-ring effects a fluid-tight seal between the coupling body and the sleeve valve 72 at the external diameter of the latter.

A helical coil compression spring 80 biases the sleeve valve 72 to extended or sealing position against the head 66 of the stem 63. This spring is accommodated in an annular space 81 which surrounds the stem 63, defined as by a cylindrical step or counterbore 82 inside the sleeve valve. At one end of the step or counterbore 82 a circumferentially extending radial shoulder 83 serves as an abutment for the forward end of the spring 80, the other or rear end of the spring reacting against a radial shoulder portion 84 of the main body 60 that surrounds the threaded joint 64.

A circular seal between the sleeve 72 and the stem head 66 is obtained by forming on them frustoconical surfaces 85 and 87 respectively that are suitably ground or lapped together in manufacture.

As the coupling parts B and C are brought together, the tubular extension 8 of the former being received within the tubular forward portion of the latter in telescopic relation, the forward end of the sleeve valve 72 is received within the forward end of the extension member 8. In this assembling operation the circular inner edge corner of the end face 27 on the extension member 8 is received against a shallow, circumferentially extending external radial shoulder 90 on the outside and intermediate the ends of the sleeve valve 72, this shoulder terminating the forward end of the external cylindrical guide surface 74 of the sleeve valve. The locating engagement of the shoulder 90 against the extreme forward end face of the coupling part B as the latter moves into the part C causes the sleeve valve 72 to be displaced from sealing engagement against the stem head 66 so that the fluid passage is opened through the chamber 70. A circumferential land 91 on the outside of the sleeve valve 72 immediately adjacent the radial shoulder 90 is closely embraced by circular wall 92 defining the front end opening of the coupling part B. The extreme forward end of the sleeve valve 72 terminates in an annular axially directed inwardly and outwardly cylindrically surfaced pilot flange 93 the outside diameter of which may be the same as, or, as shown, less than the land 91 so as to be readily received within the larger front end opening 92 of the companion coupling part in the execution of the coupling operation. Between the cylindrical land 91 and the pilot flange 93 the outer surface of the sleeve valve 72 is either cylindrical or, as shown, wherein the pilot flange is of less diameter than the land 91, such outer surface is advantageously curved or frustoconical to provide a sloping or inclined sealing surface 94 that is engaged by the O-ring 30 carried by the forward part of the coupling part B to establish the desired circular seal between the parts. In the coupled position the pilot flange 93 is disposed in a shouldered circular recess or rabbet adjacent and outwardly of the circular outlet opening 26 of the coupling part B, the internal diameter of the pilot flange being approximately equal to that of the opening.

Locking structure

The tubular coupling body 60 is counterbored from its front end providing a cylindrical internal surface 115c that is slidable over a mating external cylindrical surface 115b on the tubular extension comprising the forward end of the coupling part B. Inside the forward end of the coupling body 60 annular channel or groove 99 is bored in the cylindrical surface 115c to receive and hold captive a composite locking ring structure comprising arcuate segments 101 and a resilient split ring 100. This ring channel is spaced from forward end face 126 of the coupling part C and is located in an intermediate portion of the coupling body so that in assembling the coupling the cylindrical surface of the coupling part B is easily received within the cylindrical surface of the coupling part C for the desired piloting and centering action prior to engagement of the locking ring structure in groove 102 and prior to cracking open of the internal fluid valves.

Each of the arcuate segments 101 is formed with a circumferential rabbet or groove 120 to receive the expansible split ring 100. One side surface of the resilient split ring 100 is exposed and engages the curved face of hard steel split ring insert 121, the latter being indicated in Figs. 2 and 4. A shallow channel is formed in the bottom of the rabbet 120 in each of the segments 101 to receive the outer periphery of the lock spring ring 100, there being thus provided a narrow circumferential lip 133 overhanging the outer edge of the exposed face of the split ring.

Figure 3:
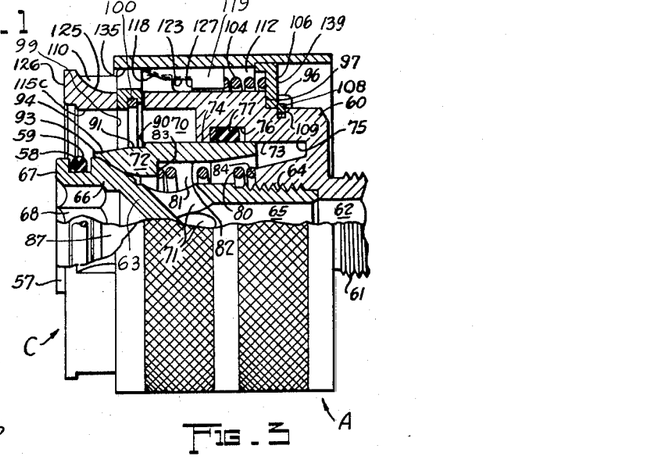
Fig. 3 is a fragmentary elevational view, partly in section, showing the outer part of the coupling assembly of Fig. 1, this view showing the internal fluid passage sealed or closed by the axially movable valve body and also showing the lock ring and lock ring actuator retracted in readiness for a coupling assembling operation.

In the retracted condition, as shown in Fig. 3 the locking ring structure is completely recessed into the channel in the body member and in no way interferes with the coming together of the coupling parts. The lock ring segments are thus exposed for engagement by inclined cam surfaces 118 formed on forward portions of the actuator sleeve ribs 119. Axial ribs 110 and sloping shoulders or groove bottoms 125 between the forward ends of the ribs are formed by axially extending slots on the outside of the body member 60. In the axial movement of the sleeve A back and forth on the body member 60, the ribs 119 ride on the central portions 128 of the segments. The wing portions 129 of the segments extend circumferentially in the channel 99 and underneath the channel bridging ribs 110 of the main body member 60.

Figure 6:
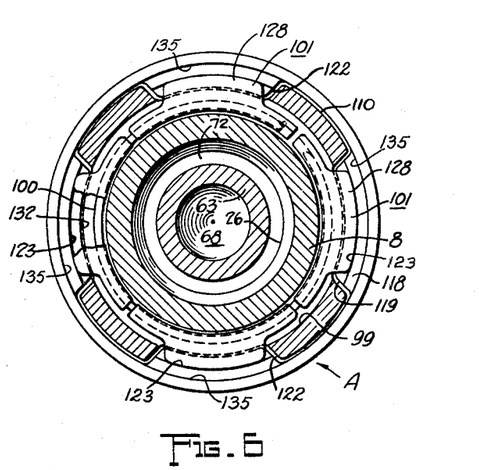
Fig. 6 is a transverse sectional view taken substantially along the planes indicated at 6—6 of Fig. 1 to show, in particular, the circumferential distribution of the segments of the locking ring structure about the body member of the outer coupling part.
Figure 7:
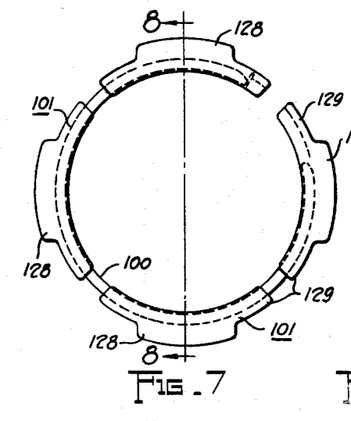
Fig. 7 is an elevational detail showing of the front of the locking ring structure.
Figures 8, 9:
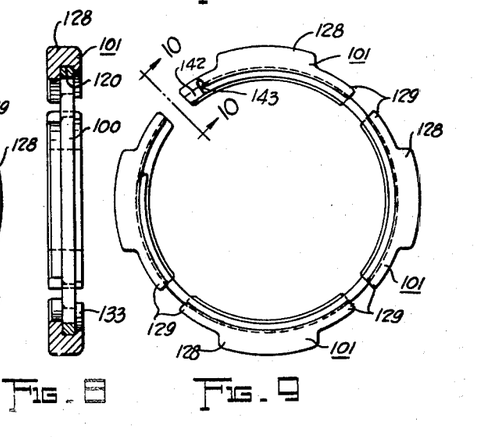
Fig. 8 is a sectional view through the locking ring taken as indicated at 8—8 of Fig. 7.
Fig. 9 is an elevational detail showing of the rear of the locking ring structure.

The cam surfaces 118 (see Figs. 3 and 6) extend between an internal axially short cylindrical surface 135 at the forward end of the coupling sleeve A and inwardly directed holding faces 123 of the ribs 119.

Figure 1:
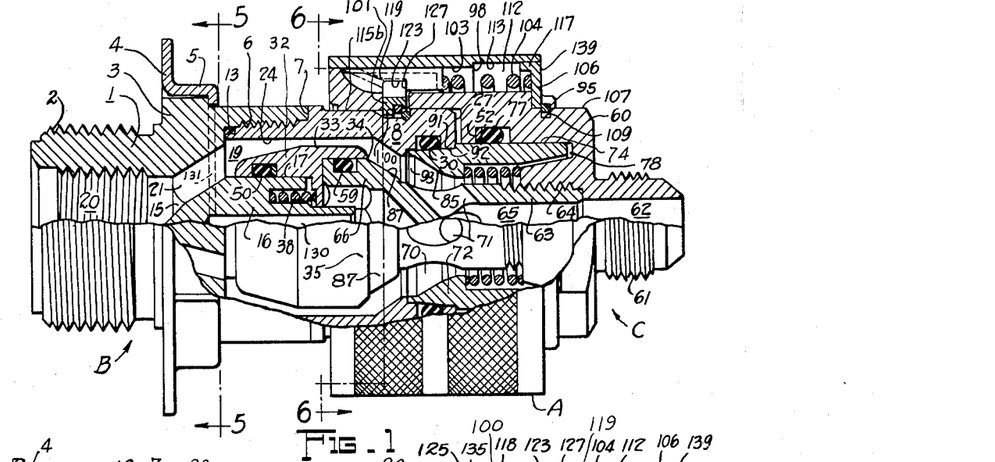
Fig. 1 is an elevational view, partly in section and with parts broken away and removed, showing a self-sealing fluid coupling of the push pull type embodying the principles of the present invention, the coupling parts being here shown in the fully assembled condition.

In movement of the actuator sleeve A from the retracted position shown in Fig. 3 to the locked position shown in Fig. 1, the inclined cam surfaces 118 ride over the central portions 128 of the ring segments 101 and effect contraction of the locking ring structure in such a manner as to force it into the annular channel 102 provided therefore in the coupling part B.

Fluid seals

Figure 2:
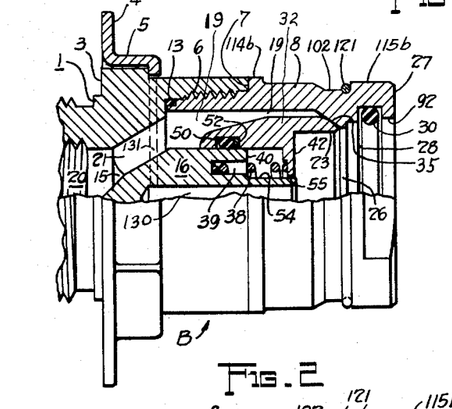
Fig. 2 is a fragmentary elevational view, partly in section, showing the internal part of the coupling assembly of Fig. 1, this view showing the sealing or closing of the internal fluid passage by the axially movable valve body.

When the coupling parts are disconnected their internal fluid passages are sealed by the spring pressed valve bodies are shown in Figs. 2 and 3. The barrel valve 32 closes the passage 19 of the coupling part B and the sleeve valve 72 closes the passage 70 in the coupling part C.

Also, in the separated condition of the coupling parts, the locking sleeve A is retracted to release the locking ring structure so that the spring ring 100 and the arcuate segments 101 are expanded radially outwardly into the channel 99. The interior of the socketed coupling part C is thus clear at the diameter of the cylindrical surface 115c for reception of the tubular extension member 8 of the coupling plug part B.

The fluid pressure prevailing in the internal passages of the coupling part B holds the barrel valve O-ring 50 to the right as viewed in Fig. 2 against its plastic backup washer 52 in the annular channel 51. It is apparent that in the passage sealing position of this barrel valve, the O-ring 50 is completely enclosed or caged in place and, as will appear, remains so enclosed in retraction of the barrel valve to passage opening position. There is thus no possibility of the O-ring escaping into the fluid stream. Similarly the sleeve valve O-ring 77 is held by internal fluid pressure to the left as viewed in Fig. 3 against its backup plastic washer 52 when the sleeve valve is in the passage sealing position shown. In the movement of the sleeve valve 72 to retracted position, as will appear, the O-ring 77 remains enclosed or caged within the annular chamber defined by the channel 76 and the cylindrical outer surface 74 of the sleeve valve, thereby eliminating any possibility of escape of the O-ring into the fluid stream in the working of the sleeve valve.

While the O-rings 30 and 59 are carried in exposed channels when the coupling parts are separated, these channels are so arranged that circumferential deformation of the O-rings in compression or distention is required to effect dislodgment. Loss of the O-rings is thus minimized.

Internal fluid pressure augments the forces of the helical coil compression springs 38 and 80 in biasing the barrel and sleeve valves toward their seats and in holding the valves in their respective passage sealing positions. This holding of the movable valve bodies against their seats by internal fluid pressure is achieved by arranging the circular seals effected by the O-rings 50 and 77 at diameters less and greater, respectively, than the diameters of the circular seats against which the movable valve bodies are engaged in their sealing positions. In the case of the barrel valve 32, the O-ring 50 effects a circular seal between the barrel valve and the stem 16 of the cylindrical stem surface 17. The fluid seal between the barrel valve and its circular valve seat 25 is approximately at the outer diameter of the barrel valve (or at some slightly lesser diameter still greater than the diameter of the stem 16, depending upon the seating efficiency or accuracy of the barrel valve against the valve seat). Thus, the difference in area between the circles defined by the diameters of the seals effected on the stem 16 by the O-ring 50 and against the seat 25 by the nose surface 35 of the valve 32 represents the effective area over which the internal fluid pressure acts on the barrel valve 32 to hold it against its seat.

In the case of the sleeve valve 72 the effective area over which the internal fluid pressure acts is represented by the difference in area of the circles defined by the diameter of the external cylindrical surface 74 of the sleeve valve with which the O-ring 77 effects a circular seal and the diameter at which the circular seal is effected between the tapered surface 85 on the forward end of the sleeve valve and the tapered valve seat 87 on the stem-head 66. The valve bodies are not dependent upon the springs 38 and 80 to remain in passage sealing positions against their respective valve seats but are held in such positions by positive fluid pressure, the seating force varying directly with the unit fluid pressure.

Coupling operation

The following sequence of relative movements of the various parts and components is described on the basis of an assumed situation wherein the coupling part B is mounted in a panel or bulkhead as by the embossed flange plate 4 so as to be supported rigidly and the operator manipulates only the coupling part C and the associated locking sleeve A in effecting the assembly. It is apparent, of course, that the sequence of relative movements is the same when both of the coupling parts are hand held or the part B is hand held and the sleeve C is fast in a suitable support or holder.

Figure 10:
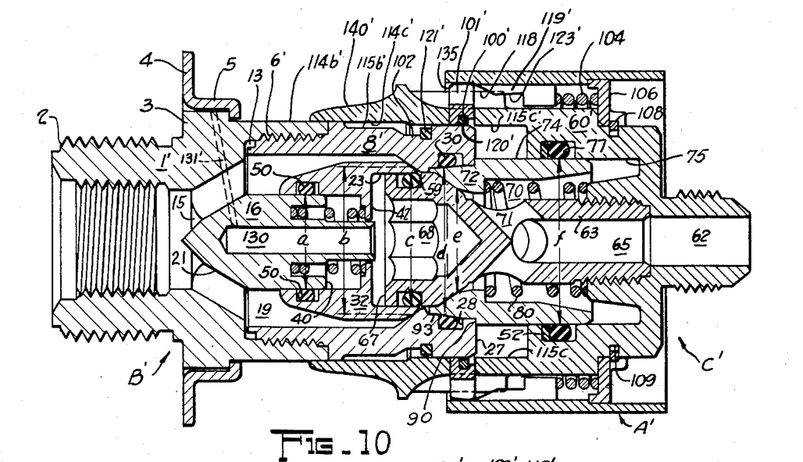
Fig. 10 is a longitudinal sectional view of a modified form of the invention illustrating an initial phase in the assembly of the coupling parts of the modification.
Figure 11:
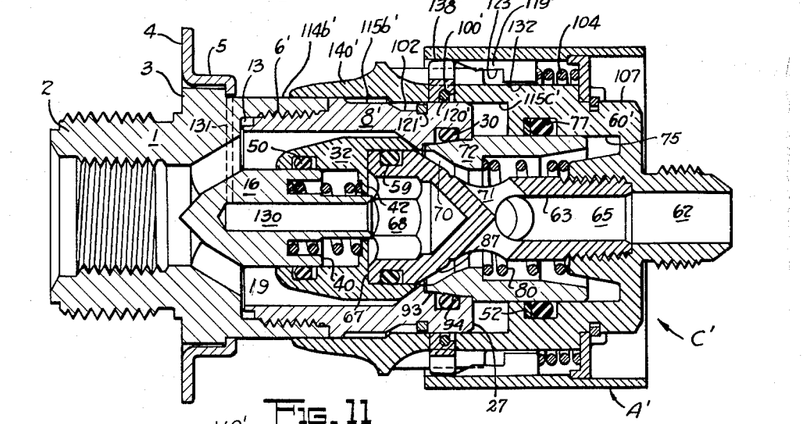
Fig. 11 is a longitudinal sectional view of the modified form illustrating the coupling parts as further assembled.
Figure 12:
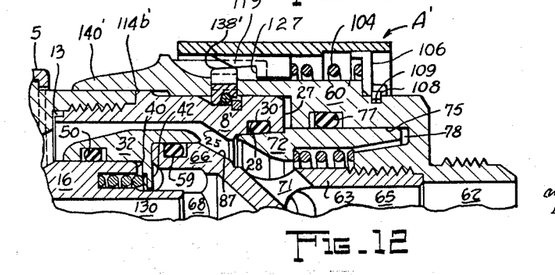
Fig. 12 is a partial sectional view showing the modification of the coupling parts as initially assembled and locked in operative position.

Figs. 10, 11 and 12 illustrate sequential stages in coupling the parts of the modified form of coupling. Figs. 10, 11 and 12 also illustrate certain detailed modifications of structural elements and in the description of such elements the detailed parts which are modified bear numeral characters corresponding to the first form except that a prime has been added. For example, in the form of Fig. 1 a cylindrical surface is indicated at 115b. In Fig. 10 a corresponding cylindrical surface is indicated at 115b'. Like parts are designated by the same reference numerals as in the preceding figures. To facilitate an understanding of the various movements which take place during the coupling operation the cross-hatching applied to the elements that are moved between successive coupling stages is heavier than the cross-hatching applied to stationary parts. Thus in Fig. 10 the heavily cross-hatched components are those which move in shifting the coupling parts from the relative position shown in Fig. 10 to the position shown in Fig. 11.

In Fig. 11 the heavy cross-hatching is applied to the components that move in shifting the coupling parts from the stage shown in Fig. 11 to the stage shown in Fig. 12.

In Fig. 12 the heavy cross-hatching is applied to the components that move in shifting the coupling parts from the stage shown in Fig. 12 to a position corresponding to that of Fig. 1.

In one of a number of structural modifications and variations which may be resorted to for the purpose of satisfying particular use requirements body member 60' of the coupling part C' is of relatively greater axial length than the tubular outer body member 60, previously described, tubular extension portion 140' being integrally formed on the front or leading end of the tubular body 60'. This extension portion has a cylindrical internal surface 114c' having a sliding fit with the external surface 114b' of the body member 1' of the coupling part B'. The modification thus provides coaxial internal cylindrical surfaces 114c' and 115c' in the outer member of the coupling part C' that sequentially and slidingly engage complemental external cylindrical surfaces 114b' and 115b' on the body members of the coupling part B'.

Figs. 10–12 also show a variation in the arrangement of the split steel rings that abut one another in the locking together of the coupling parts. Instead of the square sectioned ring being expansible and contractible and the round sectioned ring fixed, as described above, a square sectioned ring 121' is used as the fixed ring embedded and held by its inherent resistance to distention in an annular groove formed in the bottom of the main locking groove or recess 102. Segments 101' are carried on an expansible and contractible steel ring 100' which is of round section. The segments 101' are similar to the segments 101 previously described except they have round sectioned or other suitably shaped rabbets or grooves 120' to accommodate the round sectioned spring ring 100' in lieu of the square sectioned grooves 120 mentioned above.

Another variation shown in Figs. 10–12 is the use of oblique or reversely inclined surfaces 123' on the sleeve ribs 119' in lieu of axial surfaces 123 previously described. The inclination of the detent surfaces 123' is thus opposite to that of the cam surfaces 118 and as a further refinement of the design the central portions of the segments are in this modification formed with inclined outer faces 138' which match the slope of the rib detent faces 123'.

The first stage of coupling illustrated in Fig. 10 follows the initial aligning of the coupling parts in which the stepped internal diameters of the socket member 60' facilitate entry therein of the stepped diameter portions of the plug member 8'. This enables the operator to fit the parts together with considerable facility even in the dark or in a remote position where the parts cannot be seen.

At this first stage the internal fluid pasasges are still sealed by the valve bodies 32 and 72 and, of course, there is no interlocking of the mechanism between the parts. Thus the parts can be brought to the first stage of Fig. 11 and separated if desired without any opening or closing of the internal valves taking place and without any shifting of the locking structure or sleeve A'. However, the internal and external seals for the annular passage which connects the coupling parts are established. The internal seal is accomplished by the engagement of the O-ring 59 against the internal cylindrical surface 23 in the open or socket end of the barrel valve 32. The external seal is achieved by engagement of the O-ring 30 against the external surface 94 that surrounds the forward end of the sleeve valve 72. The relative movement together of the annular sealing surfaces 23 and 94 and their respective O-rings 59 and 30 has the effect of completely caging or enclosing these O-rings, or substantially so, prior to any opening of the fluid passages and prior to subjecting the O-ring seals to any high fluid pressure. Thus in the first stage or position of Fig. 11 all of the O-rings of the coupling structure are substantially completely enclosed and the possibility of loss or dislodgment into the fluid stream is eliminated.

Because the design of the coupling results in a geometry that causes the axially movable valve bodies 32 and 72 to be held against their respective seats by internal fluid pressure when the coupling parts are disassembled, it is apparent that the force to be applied by the operator in the coupling operation is determined by the internal pressure in the fluid line or lines to which the coupling parts are attached. The higher the fluid pressure in either of the lines, the greater is the force that the operator must exert to unseat the valve body which seals the fluid passage in the coupling part terminating such line. Obviously then the differences in the diameters of the circular seals that establish the fluid pressure differentials will be determined by the fluid pressure normally prevailing in the lines to be coupled. The illustrated embodiments of the invention, although designed for use in fluid systems that carry hydraulic liquid at pressures as high as 3,000 pounds per square inch gauge, are not intended for manual coupling and uncoupling at such pressures but at lower pressures, such as in the range of from about 30 to about 90 pounds per square inch gauge, usually in the neighborhood of about 60 pounds per square inch gauge. This relatively low minimum pressure of about 60 pounds per square inch gauge is that which is maintained as by pressurized or charged reservoirs when the system is inactive. Should it be desired to effect manual coupling and uncoupling at pressures in excess of the low range mentioned, it is feasible to alter the diameters of the circular seals associated with the respective valve bodies 32 and 72 so that the axial force exerted on the valve body is minimized or completely eliminated and the biasing and seating forces acting on the valves are supplied wholly by the springs. For use in systems in which the prevailing fluid pressures are relatively low, it is feasible to increase the differential of the diameters of the fluid seals to obtain any desired biasing or seating force through internal fluid pressure. In the case of couplings designed for use in vacuum or negative pressure systems the relationship of the fluid seal diameters is reversed from that illustrated. That is to say, referring to Fig. 10, diameter $a$ is made larger than the diameter $b$, and the diameter $e$ is made larger than the diameter $f$, to obtain the benefit of atmospheric pressure to hold the valves seated when the lines to which the coupling parts are connected are at negative pressure or used in a vacuum system. Similarly the diameters $a$ and $f$ are made larger than the diameters $c$ and $d$, respectively, in a vacuum or negative pressure system so that the valve bodies are biased toward their respective seats by differential atmospheric pressure components.

In the movement of the parts to the initial position of Fig. 10, this initial position being determined by engagement of the end abutment face 27 of the extension body 8' on the part B' against the shallow radial shoulder 90 on the sleeve 72 of the part C', any air trapped within the annular space defined by the coupling parts outside the O-ring 30 escapes to the atmosphere through the openings in the outer member for the locking structure segments or the clearances between the two coupling parts at the diameter of the cylindrical surfaces 115b' and 115c'. Air trapped between the stems 16 and 63 and within the barrel valve 32 by the sealing action of the O-rings 50 and 59 is vented to the atmosphere.

This venting is accomplished through either of the stems 16 or 63, the former being used for the purpose in the present design. An axial bore 130 is formed longitudinally in the stem 16. This bore is closed at one end and at the other end is open through the end of the stem in the provision of a passage continuous with the cylindrical recess 23 of the valve 32 (and with the recess 68 in the end of the stem 63 when the latter is received in the end of the barrel valve 32). The inner or closed end of the bore 130 is in communication with one or more radial passages 131 drilled or otherwise formed through or adjacent the hex portion of the body 1. The passage or passages 131 extend through the partition 15 that supports the stem 16 at a point or points intermediate the oblique passages 21. The outer end or ends of the vent passages open through the cylindrical surface of the body 1 adjacent the hex 3 and under the inturned flange of the plate embossment 5 or, alternatively and as shown at 131' in Fig. 10, the vents may open through the flats on the hex portion 3 of the body. Vents which open through the hex flats are thus located within the hex embossment 5 of the mounting plate 4 and are protected against the entrance of dust and dirt. Suitable clearances are, in such case, provided between the mounting plate and the surfaces of the hex 3 enclosed thereby to permit atmospheric air to flow into and out of the vent passage or passages 131'. The hex flats and radial faces of the hex may, for example, be notched or grooved to provide air vent channels.

*Second stage of coupling*

The resultant of all forces exerted on the sleeve valve 72 by the fluid of the line is always to the left as viewed in the figures or so that the sleeve valve is biased toward or held against the seat 87. Thus the resultant of all forces on the sleeve valve 72 (spring 80 and fluid) always acts toward passage sealing position. The fluid force is automatically diminished immediately upon cracking open of the sleeve valve, thus:

As the coupling part C' is advanced relatively onto the coupling part B' from the Fig. 10 stage to the Fig. 11 stage the engagement of the end or abutment face 27 of the extension body 8' against the circumferential shoulder 90 of the sleeve valve 72 displaces the latter from sealing engagement against the stem head seat 87.

As soon as the valve 72 is displaced from its seat 87 the high pressure fluid from the internal passages of the coupling part C' flows around the nose or annular pilot flange 93 of the sleeve valve and into the O-ring channel 28, forcing the O-ring 30 against the right-hand wall of the channel as shown in Fig. 11. This displacement of the valve 72 admits high pressure fluid from the internal passages 62 and 65 of the part C' to act against the frontal area of the sleeve valve to diameter $d$ which represents the area controlled by the circular seal between the O-ring 30 and the outwardly directed surface 94 on the forward end of the sleeve valve. Thus upon displacement of the sleeve valve 72 from its seat, there is a reduction in the net axial force exerted on the sleeve valve by the pressure of the fluid in the line to which the coupling part C' is attached, and the force applied during movement of the parts from the first stage of Fig. 10 to the second stage of Fig. 11 is less than the force for opening the valve 72. The amount of this reduction in the fluid pressure force which biases the valve toward and against the seat 87 is equivalent to the unit fluid pressure over an effective annular area equivalent to the difference between the areas of circles having diameters $d$ and $e$. The forward end of the sleeve valve 72 on which is formed the surface of revolution 94 sealingly engaged by the O-ring 30 is smaller (diameter $d$) than the outer cylindrical surface 74 (diameter $f$) with which the O-ring 77 makes circular contact.

Third stage of coupling

In the continued movement of the coupling part C' onto the coupling part B' from the second stage position shown in Fig. 11 to the third stage position (not shown) the engagement of the end face 67 on the head of the stem 63 against the web or partition 42 of the barrel valve 32 displaces the latter from its seat 25, thereby placing the internal passages of the coupling parts in communication with one another and with the annular passage or channel 19 that surrounds the barrel valve 32. Air or other fluid trapped between the stem ends is vented through the passage 131 as previously mentioned.

The force to be applied by the operator to open the barrel valve 32 depends upon the presence or absence of fluid pressure in the passages of the coupling part B' and also upon the presence or absence of fluid pressure in the passages of the coupling part C'. As soon as the sleeve valve 72 is cracked open in a situation involving fluid under pressure in the coupling part C' such fluid immediately finds its way to the nose of the barrel valve and reacts against the front of such valve over an effective area determined by the diameter $c$, which is the circular seal effected by the O-ring 59, and the diameter at which the barrel valve 32 effects circular seal against the frusto-conical seat 25. This latter diameter is here represented at $b$. In the assumed situation, wherein the coupling part B' contains fluid under pressure, the fluid pressure force holding the barrel valve 32 against the seat 25 is opposed by the force acting across the front of the barrel valve of the fluid under pressure which is released into the space or chamber between the seals 30 and 59 upon cracking open of the sleeve valve 72. Thus the force that the operator must apply to unseat the barrel valve 32 is decreased when the coupling part C' is under pressure. When displaced from its seat the barrel valve 32 is subject to the axial force determined by the differences in areas of the circles defined by the diameters $a$ and $c$, this being the force biasing the valve body to its seat due to the internal fluid pressure and which, in addition to the force of the valve spring must be overcome through the stem 16 to hold the barrel valve away from its seat.

In a situation involving fluid pressure in the coupling part B' but not in the coupling part C' the cracking open of the sleeve valve 72 in the first stages of assembly is not followed by the exposing of the front end of the barrel valve 32 to fluid under pressure and the force to be applied by the operator to unseat the barrel valve is equivalent to that by which the combined spring and internal fluid pressure forces hold the barrel valve against its seat 25 in the uncoupled condition of the parts. Not only are differential fluid pressure forces brought into play to reduce the net forces required to hold the valves disengaged from their respective valve seats, but the sequential operation described avoids the difficulty of overcoming simultaneously the relatively large forces by which the valves are held against their seats by the fluid line pressures. This feature of the invention is apparent from a consideration of Fig. 10, wherein the sleeve valve 72 is about to be separated from its seat 87. In this valve opening step there are no axial forces transmitted between the rigid stem 63 and the barrel valve 32 other than the friction of the O-ring 59 sliding in the cylindrical surface 23 of the barrel valve. Thus the sleeve valve 72 has been displaced from its seat (Fig. 11) prior to the engagement of the stem end 67 against the partition web 42. At the instant the end 67 of the stem 63 is brought to bear against the barrel valve 32 for the purpose of displacing the latter from its seat (against the relatively high force exerted on such valve by the fluid line pressure) the resultant fluid pressure net force on the sleeve valve 72 has been reduced from the relatively high fluid pressure force that prevails when the valve is closed to the lesser or reduced fluid pressure force that prevails in the open position of the sleeve valve.

In the valve opening stages of the coupling operation the sleeve A' remains in retracted position with the locking structure comprising the spring ring 100' and the segments 101' in their fully expanded positions. In this connection it is significant that, although the operator applies the coupling force to the sleeve A', there is no relative movement of the sleeve on the body 60', the lock spring 100' being sufficiently stiff and over-formed to a larger diameter to resist compression by the cams 118 under such axial forces as are necessary to effect sequential unseating of the valves 72 and 32 against the internal fluid line pressures normally encountered and incidental friction.

When the parts have been moved to the third stage of assembly (not specifically illustrated) both the sleeve valve 72 and the barrel valve 32 are displaced from their seats so that the axial force that must be exerted on the coupling parts to hold them assembled at this stage is minimized by reason of the differential or balancing fluid pressures referred to. The limit of movement together of the coupling parts is determined by bottoming of one or both of the valves 32, 72. This bottoming prevents further telescoping together of the coupling parts and the operator completes the coupling operation by increasing the axial force on the sleeve A' so as to advance the latter axially forward on the tubular body 60' or to the left as viewed in the figures. This movement of the sleeve carries the cam surfaces 118 of the ribs 119' across the central portions 128 of the segments 101' and forces the latter and the locking ring 100' to contact radially inwardly into the channel 102 of the body member of the companion coupling part, thereby effecting the desired interlock, Fig. 12. Bottoming normally occurring here is not shown since Fig. 12 also represents uncoupling. The locking ring 100' is received in its contracted shape behind the circular sectioned abutment ring 121' embedded in the groove 102.

Continued movement of the actuating sleeve A' from the fourth stage position of Fig 12 to the fifth stage or locked position carries the holding portions 123' of the ribs 119' onto the segments 101'. Force components tending to shift the sleeve A' to release position are thus eliminated from the forces exerted by the locking ring spring 100' against the ribs 119' through the segments 101'. The limit of forward movement of the sleeve A' relative to the body member 60' of the coupling part C' is determined by engagement against rear faces of the segments 101' of radial shoulders 127 on the ribs 119' adjacent the inclined surface detent rib portions 123'.

When the operator has completed the assembly of the couplings and releases the sleeve A' the internal fluid pressure tends to separate the coupling parts and causes the spring locking ring 100' to bear strongly against the side face of the rigid insert ring 121'. There is thus a slight shifting apart of the components of the coupling as the final stage of the assembling operation is completed, the partition 42 of the barrel valve 32 moving away from the end face 40 of the stem 16 against which it was bottomed during application by the operator of sufficient axial force to the sleeve A' to effect the contraction of the locking structure into the groove 102, and the rear end of the sleeve valve 72 moving relatively away from the bottom of the annular channel 75 to leave a clearance 78 which allows the sleeve valve to back slightly away from the radial end face 27 of the other or companion coupling part.

In effecting the separation of the coupling parts from the interlock engagement of Fig. 1 the sleeve A is retracted or moved to the right to the release position shown in Fig. 3. The segments 101 being no longer confined or embraced by the sleeve are shifted radially outwardly by the force of compressed locking ring 100, the attendant expansion of the locking ring freeing it from behind the fixed abutment ring 121 and thereby releasing the interlock between the coupling parts. When the rings 100 and 121 are thus disengaged the coupling parts are readily pulled apart, the reaction of the fluid pressure against the valves 32 and 72 forcing the valves to their respective passage sealing positions. The movement of the valves against their valve seats effects axial separation of the coupling members.

Dimensional tolerances that are employed in designing couplings of the present type result in certain permissive axial clearances which allow slight axial shifting of one coupling part relative to the other even when the rings 100 and 121 are interlocked. In the constructions illustrated the springs that bias the valves 32 and 72 toward their seats react against the coupling parts so as to maintain a yielding axial force which holds the contracted locking ring 100 against the fixed ring 121. Thus looseness of the joint and rattling are eliminated or at least minimized. During the uncoupling the O-rings 50 and 77 maintain their seals with the valves 32 and 72, and the O-rings 30 and 59 maintain the circular seals until subsequent to the seating of the valves with which they are associated. Since all of the O-ring seals are maintained until the valve bodies are seated the loss of fluid from the system is practically eliminated. The significance of this feature is apparent from a consideration of Fig. 10, which shows but a minimum chamber available between the O-ring seals 59 and 30 for entrapment of fluid that is lost from the system when the coupling parts are separated. It is likewise apparent that this same minimum chamber represents the volume of air trapped between the coupling parts on reassembly. Thus the amount of air entrained in the fluid system during the coupling operation is minimized.

The movement of the tapered or frustoconical surface 94 on the leading end of the sleeve valve 72 into the resilient rubber O-ring 30 compresses the latter progressively and the reaction force of the O-ring includes an axial component which opposes the thrust of the valve seating spring and the differential fluid pressure. Since the resistance to compression of the O-ring 30 progressively increases as the sleeve valve moves to its limit of penetration into the end recess of the body member 8, the O-ring strongly damps vibrations of the sleeve valve 72.

Although the description of the invention has been made by reference to a situation in which the present coupling is used in a pressurized fluid line, it is apparent that the invention is applicable to couplings used in vacuum or suction lines. That is to say, the substantially complete caging or enclosing of the deformable seals and the permissive movement of the valves under surge and vibration conditions maintains adequate seals at the several points against high pressures, whether they be applied internally or externally of the coupling. This feature is valuable not only for direct application of the fluid coupling in a vacuum or suction line but also when the device is used in a pressurized line, since it is a not uncommon occurrence that a normally pressurized line will experience transient conditions of low or negative pressure followed by some application of high internal pressure.

The present invention thus provides a self-sealing fluid coupling of generally improved construction and design and particularly suited for use in association with a push pull type of locking mechanism. The coupling is capable of withstanding fluid pressure surges and even conditions of vacuum or suction on the line without separating or breaking the circular seals between the bridging valve bodies and the coupling members. Although illustrated as a structure comprising tubular outer and axially aligned inner stem members bridged by valve bodies biased to passage sealing positions by both spring and fluid pressure forces, it is apparent that the invention provides structural subcombinations and mechanical and operating features that can be used separately and to advantage in couplings of other types.

In accordance with the patent statutes the principles of the present invention may be utilized in various ways, numerous modifications and alterations being contemplated, substitution of parts and changes in construction being resorted to as desired, it being understood that the embodiments shown in the drawings and described above and the particular operating procedures set forth are given merely for purposes of explanation and illustration without intending to limit the scope of the claims to the specific details disclosed.

What we claim and desire to secure by Letters Patent of the United States is:

1. In a self-sealing coupling for a fluid pipe system, the combination of two separable axially aligned parts having internal passages opening through their ends, means for connecting and locking said parts together in end to end assembled relation with their passage openings in registry, one part comprising a hollow tubular body member, an elongated stem disposed within the body member in spaced coaxial relation, the body member and the stem being separated by an annular chamber surrounding the stem and constituting a portion of the internal passage of the one part, said stem having one of its ends rigidly secured to the body member to be supported thereby and having the other of its ends formed with an annular valve seat, a sleeve valve disposed in the annular chamber, said valve surrounding the stem and being surrounded by the body member, the valve being movable axially relative to the stem and the body member between an advanced position in which the valve makes circular sealing contact with the valve seat and a retracted position in which the valve is withdrawn from the valve seat, means effecting a circular first seal of fixed predetermined diameter between the sleeve valve and the surrounding body member in all positions of the sleeve valve, one end of the valve constituting a pilot portion and being formed with an annular circular sectioned outwardly directed sealing surface of greater diameter than the circular sealing contact between the valve and the seat, the other part of the coupling comprising another hollow tubular body member having a forward end portion formed to receive the pilot end portion of the sleeve valve in axially interfitting relation one within the other as the coupling parts are brought together, such forward body end portion having an inwardly directed annular surface which surrounds the outwardly directed sealing surface on the pilot end portion of the received sleeve valve, such forward body portion being formed with an internal circular recess in said annular surface, such circular recess having confronting annular walls and being open toward the received sleeve valve, an annular sealing element of resilient deformable material in such circular recess, the body member of such other coupling part and the sleeve valve being formed with radial abutments adapted during assembly to engage one another in a plane transverse to the axis of the coupling to displace the sleeve valve from its advanced sealing position as the coupling parts are assembled, the annular sealing element being formed to engage in embracing relation the annular sealing surface of the sleeve valve as the pilot end portion of the latter is received within the forward end portion of the body member of said other coupling part and to establish a circular outer second seal of substantially fixed predetermined diameter between the parts, said second seal being spaced axially from the plane of abutment and having a diameter less than the diameter of the first seal to obtain in the assembled coupling a fluid pressure force tending to hold the sleeve valve against the body member of the other coupling part, said annular sealing surface of the sleeve valve extending in both directions axially beyond the annular sealing element when embraced by such sealing element, the annular sealing surface of the sleeve valve being disposed during movement of the sleeve valve into the forward end of said other body member and effective at the instant said circular outer seal is established to retain the sealing element caged in the circular recess against the force of fluid under pressure acting on the sealing element from within said other body member, the axial distance between the abutment plane and the second seal being less than the axial length of the interfitting relation between said forward end portion of the other body member and the pilot end portion of the sleeve valve, and said second seal being effected in assembly before the sleeve valve abuts the said other part and before such sleeve valve is displaced from sealing engagement with its seat.

2. In a coupling combination substantially as set forth in claim 1, the sleeve valve being formed with an external circumferentially extending radial shoulder constituting said abutment for engagement with the body member of the other coupling part, said shoulder being in a transverse plane normal to the axis of the coupling and spaced from both ends of the sleeve valve, the annular sealing surface on the pilot end of the sleeve valve extending forwardly from the shoulder in one direction, and the sleeve valve being formed with an external substantially cylindrical surface of larger diameter throughout its length than all portions of the annular sealing surface, said larger diameter external surface extending rearwardly in the other direction from the shoulder, such last named cylindrical surface being embraced by the circular sealing means to establish said circular seal at such larger diameter and being slidingly engaged and surrounded by the body member of said one part.

3. In a self-sealing coupling comprising two separable companion parts for use in a pipe system carrying fluid under pressure, the combination of such parts each comprising a tubular outer member and an inner stem member rigidly secured to the outer member in coaxial relation, the inner and outer members of each part cooperatively defining therein an annular fluid passage surrounding the stem member and opening through the end of the part, means connecting and locking said parts together in end to end assembled relation with their respective inner and outer members axially aligned, one of the outer members being formed with an internal circular valve seat, a valve carried by that one of the stem members which is secured to the one outer member, said valve being movable axially relative to the one stem member and the one outer member between an advanced sealing position and a retracted open position, means effecting a first circular seal of predetermined substantially fixed diameter between the valve and the one stem member throughout the relative movement range of such valve, the valve and the other of the stem members being formed with coaxial plug and socket end elements adapted to interfit one within the other in telescoping relation as the coupling parts are assembled together, the valve and such other stem member also being formed with radial abutments adapted to engage one another in a plane transverse to the axis of the coupling during such assembly whereby to displace the valve from its advanced sealing position and open the fluid passage in the one outer member, the plug and socket end elements being formed with inner and outer confronting axially extending annular surfaces of revolution, an annular sealing element of resilient deformable material carried by one of said end elements and recessed in such annular surface thereof, said last mentioned sealing element engaging the annular surface of the other of the plug and socket elements as the plug element is received telescopically within the socket element to establish a second circular seal of predetermined substantially fixed diameter, the valve constituting a bridge between the aligned inner stem members of the two parts and sealing off the space inside the valve between the first and second circular seals from the fluid passages and restricting the effective area of the valve subject to axial thrust forces imposed by fluid under pressure in the annular passages to the difference in area between circles having the diameters of the first and second seals, said annular surface on the other of the interfitted plug and socket elements extending in both directions axially beyond said last mentioned sealing element, said second seal being spaced axially from the plane of abutment between the valve and said other stem member, the axial distance between the second seal and such plane of abutment being less than the axial length of the interfit of the plug element within the socket element to establish such seal between the plug and socket elements during assembly prior to said abutting engagement between the valve and the other stem member and before the valve is displaced from the internal valve seat to open the fluid passage in the one outer member, the stem members of the two parts and the valve being formed cooperatively to define an internal chamber continuous to and sealed by said second seal, said establishment of said second seal prior to said abutting engagement effecting a volumetric decrease of said sealed chamber during assembly of the coupling parts, and one of the parts being formed with a vent passage communicating with the internal chamber to relieve pressure differentials resulting from such volumetric decrease.

4. In a self-sealing coupling combination substantially as set forth in claim 3, the valve being hollow and having an internal web formed with an aperture, the one stem including an axial extension received through the web aperture and having a sliding fit therein to guide the axial movements of the valve, and the other stem being formed with an axial end recess disposed to receive the extension of the one stem projected through the web as the parts are assembled.

5. In a self-sealing coupling of the type comprising two companion parts fitting together in end to end relation for facile assembly and disassembly for use in a pipe system carrying fluid under pressure, the combination of such parts each comprising a tubular outer member and an inner stem member rigidly secured at one end to the outer member in coaxial relation, the inner and outer members of each part cooperatively defining an annular fluid passage which surrounds the other end of the stem member and opens axially through an end of the outer member, the annular end opening of one part being registered with the annular end opening of the companion part in the assembled coupling, the tubular outer member of one part and the inner stem member of the other part each being formed with a circular valve seat, each coupling part having a valve mounted therein for axial movement between an advanced position in which the valve engages its seat in a circular seal of fixed diameter and a retracted passage opening position, resilient deformable sealing elements interposed and effecting circular primary seals of predetermined substantially fixed diameters between the valves and their respective coupling parts continuously and in all positions of the valves relative to their respective coupling parts, each primary seal having a different diameter than the seat seal associated with the same valve so that each seated valve is biased toward its seat by fluid pressure in the corresponding annular passage, the stem member of one part and the valve of the other part being formed with a first matched pair of coaxial plug and socket end elements adapted to interfit as the coupling parts are assembled together, the outer member of the other part and the valve of the one part being formed with a second matched pair of plug and socket end elements, each valve and the member with which it interfits being formed with complemental radial abutments adapted to engage one another during assembly in a plane transverse to the axis of the coupling and unseat the valve, the plug and socket end elements of each pair being formed with outwardly and inwardly directed axially extending confronting annular surfaces of revolution which telescope one within the other during assembly, one of the end elements of each pair being formed with a circumferential recess in its anular surface, an annular sealing element of resilient deformable material in each such recess, said last mentioned sealing elements each engaging in a secondary circular seal, the annular surface of the other of the pair of end elements as the plug elements are received within the socket elements in assembly, each of said secondary seals in the assembled coupling being spaced axially from the abutment plane of the valve and the part member between which it is established, the engaged annular surfaces of revolution each extending axially in both directions from and beyond the corresponding secondary seal, the axial distance from each secondary seal to the corresponding abutment plane being less than the axial length of the interfitting relation of the respective plug and socket end elements, each of said last mentioned sealing elements engaging the annular surface with which it establishes one of the secondary seals and also traveling axially along such annular surface in engagement therewith before the abutments of the corresponding valve and part member are in engagement to accommodate small axial shifting movements of the valves relative to the part members against which the valves are respectively abutted without breaking the secondary seals, the axial distance between and spacing the member and valve abutments of one coupling part being less than the corresponding distance between and spacing the member and valve abutments of the other coupling part, the axial distance between the valve abutment plane of such last named one coupling part and the secondary seal established on the valve of the other coupling part being greater in the assembled coupling than the distance between such last named plane and the nearest end of the annular sealing surface on which such last mentioned secondary seal is established, the secondary seals both being established in assembly prior to valve displacing engagement between either valve abutment and its complemental part member abutment, and the one valve carried by the coupling part having the shorter axial distance between its abutments being displaced from its advanced sealing position to open the fluid passage in the corresponding coupling part before the other valve is displaced from sealing position, whereby fluid under pressure in the annular passage of such last named one coupling part released into the annular connecting opening between the coupling parts is confined by the secondary seals and applies an axial fluid pressure force against the other valve acting to augment the abutment force against such other valve to unseat the latter subsequent to the unseating of the one valve.

6. In a coupling combination substantially as set forth in claim 5, the part having the valve seat on the stem member also having the lesser distance between part member and valve abutments whereby the stem seated valve is the first valve displaced during assembly of the coupling, and in assembly the opening of the stem seated valve and the release of fluid under pressure in the system into the annular opening between the parts applies the fluid pressure force axially against the valve seated on the outer member to augment axial abutment force in unseating the last mentioned valve.

7. In a coupling combination substantially as set forth in claim 5, the stems of the two parts and one of the valves cooperatively defining an internal chamber, such internal chamber being continuous to both the primary and secondary seals associated with such last mentioned one valve, whereby relative axial movement toward one another of the two stems incidental to assembly of the coupling effects a reduction in volume of the sealed internal chamber, and one of the parts having an external vent opening and a passage connecting such vent opening to the sealed internal chamber so that pressure build up in the sealed chamber during assembly of the coupling parts is eliminated.

8. In a coupling combination substantially as set forth in claim 5, the part having the valve seat on the stem member also having the lesser distance between part member and valve abutments whereby the stem seated valve is the first valve displaced during assembly of the coupling, the stems of the two parts and the valve which seats on the outer member cooperatively defining an internal chamber, such internal chamber being continuous to both the primary and secondary seals associated with the last mentioned valve whereby in assembly the opening of the stem seated valve and the release of fluid under pressure in the system into the annular opening between the parts applies the fluid pressure force axially against the valve defining the sealed internal chamber to augment axial abutment force in unseating such chamber defining valve, the relative axial movement toward one another of the two stems during assembly effecting a reduction in volume of the sealed internal chamber, and one of the parts having an external vent opening and a passage connecting such vent opening to the sealed internal chamber so that pressure build up in the sealed chamber during assembly of the coupling parts is eliminated.

9. In a self-sealing coupling of the type comprising two companion parts fitting together in end to end relation for facile assembly and disassembly for use in a pipe system carrying fluid under pressure, the combination of such parts each comprising a tubular outer member and an inner stem member rigidly secured at one end to the outer member in coaxial relation, the inner and outer members of each part cooperatively defining an annular fluid passage which surrounds the other end of the stem member and opens axially through an end of the outer member, the annular end opening of one part being registered with the annular end opening of the companion part in the assembled coupling, the tubular outer member of one part and the inner stem member of the other part each being formed with a circular valve seat, each coupling part having a valve mounted therein for axial movement between an advanced position in which the valve engages its seat in a circular seal of fixed diameter and a retracted passage opening position, resilient deformable sealing elements interposed and effecting circular primary seals of predetermined substantially fixed diameters between the valves and their respective coupling parts continuously and in all positions of the valves relative to their respective coupling parts, each primary seal having a different diameter than the seat seal associated with the same valve so that each seated valve is biased toward its seat by fluid pressure in the corresponding annular passage, the stem member of one part and the valve of the other part being formed with a first matched pair of coaxial plug and socket end elements adapted to interfit as the coupling parts are assembled together, the outer member of the other part and the valve of the one part being formed with a second matched pair of plug and socket end elements, each valve and the member with which it interfits being formed with complemental radial abutments adapted to engage one another during assembly in a plane transverse to the axis of the coupling and unseat the valve, the plug and socket end elements of each pair being formed with outwardly and inwardly directed axially extending confronting annular surfaces of revolution which telescope one within the other during assembly, one of the end elements of each pair being formed with a circumferential recess in its annular surface, an annular sealing element of resilient deformable material in each such recess, said last mentioned sealing elements each engaging in a secondary circular seal the annular surface of the other of the pair of end elements as the plug elements are received within the socket elements in assembly, each of said secondary seals in the assembled coupling being spaced axially from the abutment plane of the valve and the part member between which it is established, the engaged annular surfaces of revolution each extending axially in both directions from and beyond the corresponding secondary seal, the axial distance from each secondary seal to the corresponding abutment plane being less than the axial length of the interfitting relation of the respective plug and socket end elements, each of said last mentioned sealing elements engaging the annular surface with which it establishes one of the secondary seals and also traveling axially along such annular surface in engagement therewith before the abutments of the corresponding valve and part member are in engagement to accommodate small axial shifting movements of the valves relative to the part members against which the valves are respectively abutted without breaking the secondary seals, the axial distance in the assembled coupling being greater from each valve abutment to the secondary seal of the other valve than to the nearest end of the annular sealing surface on which such last mentioned secondary seal is established, the secondary seals both being established in assembly prior to valve displacing engagement between either valve abutment and its complemental part member abutment, and the diameters of the secondary seals each being intermediate the diameters of the associated primary and seat seals of the respective valves, whereby each valve is subjected when unseated to an axial force resulting from fluid under pressure in the system, which force is less than but acts in the same direction as the axial biasing force exerted on the seated valve by fluid pressure of like magnitude in the annular passage of the corresponding part.

10. In a self-sealing coupling combination substantially as set forth in claim 3, the internal chamber being also continuous to the first seal, whereby the vent passage relieves the internal chamber of pressure developed between said first and second seals during assembling of the coupling parts.

11. In a self-sealing coupling combination substantially as set forth in claim 3, the stems each being formed with an open ended recess, said stem recesses being axially aligned and continuous with one another when the parts are assembled and cooperatively defining a part of said internal chamber.

12. In a fluid coupling comprising a pair of tubular body members adapted to be assembled together in aligned interfitting relation and having a fluid passage continuous through the members, axial stems within and fast to the members, the stems being aligned in the assembled coupling and having portions spaced from the tubular members by annular chambers, said fluid passage comprising the annular chambers, one of the members being formed with an internal annular valve seat, a valve embracing one of the stems and movable axially thereon to and from sealing engagement against the valve seat, the other stem being moved axially toward the one stem during assembly and adapted to bear axially against the valve to move the valve from the seat, the stems and the valve being formed to define an internal chamber between the stems in the assembled coupling, annular sealing means between the valve and the one stem forming a first circular seal between the internal chamber and the fluid passage, means effecting a seal between the valve and said other stem during assembly, such last mentioned seal constituting a second circular seal between the internal chamber and the fluid passage, the volume of the sealed internal chamber being reduced as the body members are assembled and said other stem is moved axially toward the one stem, such volume being increased as the body members are disassembled and said other stem moves axially away from the one stem, a vent passage formed through one of the stems and the tubular member to which such stem is fast, said vent passage having an outwardly directed opening in the tubular member in which it is formed and being continuous from the internal chamber to such opening, a mounting plate having an aperture through which the last mentioned tubular member is received, the mounting plate being formed with an embossment about the aperture, the tubular member so received having a radial enlargement received within the plate embossment and having radial abutment means, said abutment means being adapted to engage and locate the mounting plate in predetermined axial position relative to the received tubular member, and the opening of the vent passage being within the axial limits of the located mounting plate and covered by the latter.

13. In a coupling combination substantially as set forth in claim 1 in which the valve and the body member surrounding it are formed to provide clearance behind the valve in the locked together condition of the coupling parts for limited movement of the valve in backing away from the radial abutment of the other coupling part, the pilot end sealing surface of the valve being axially tapered to permit progressive expansion and to effect progressive compression of the sealing element alternatively as the valve respectively backs away from and returns into engagement with the radial abutment of the body member of the other coupling part in yielding to fluid pressure surges within the coupling, the reaction of the sealing element against the sealing surface of the valve providing a force having one component opposing movement of the valve toward such last mentioned abutment to dampen vibrations of the valve.

References Cited in the file of this patent
UNITED STATES PATENTS

| 1,873,304 | De Mooy | Aug. 23, 1932 |
| 2,434,167 | Knoblauch | Jan. 6, 1948 |
| 2,471,237 | Pasturczak | May 24, 1949 |
| 2,553,680 | Scheiwer | May 22, 1951 |
| 2,661,967 | Mitchell | Dec. 8, 1953 |
| 2,671,516 | Grant | Mar. 9, 1954 |
| 2,837,352 | Wurzburger | June 3, 1958 |

OTHER REFERENCES

| 555,692 | Great Britain | Sept. 2, 1943 |
| 799,937 | France | Apr. 20, 1936 |